INVENTORS
FRANK H. FISHER
BY and WILLIAM G. HANLEY

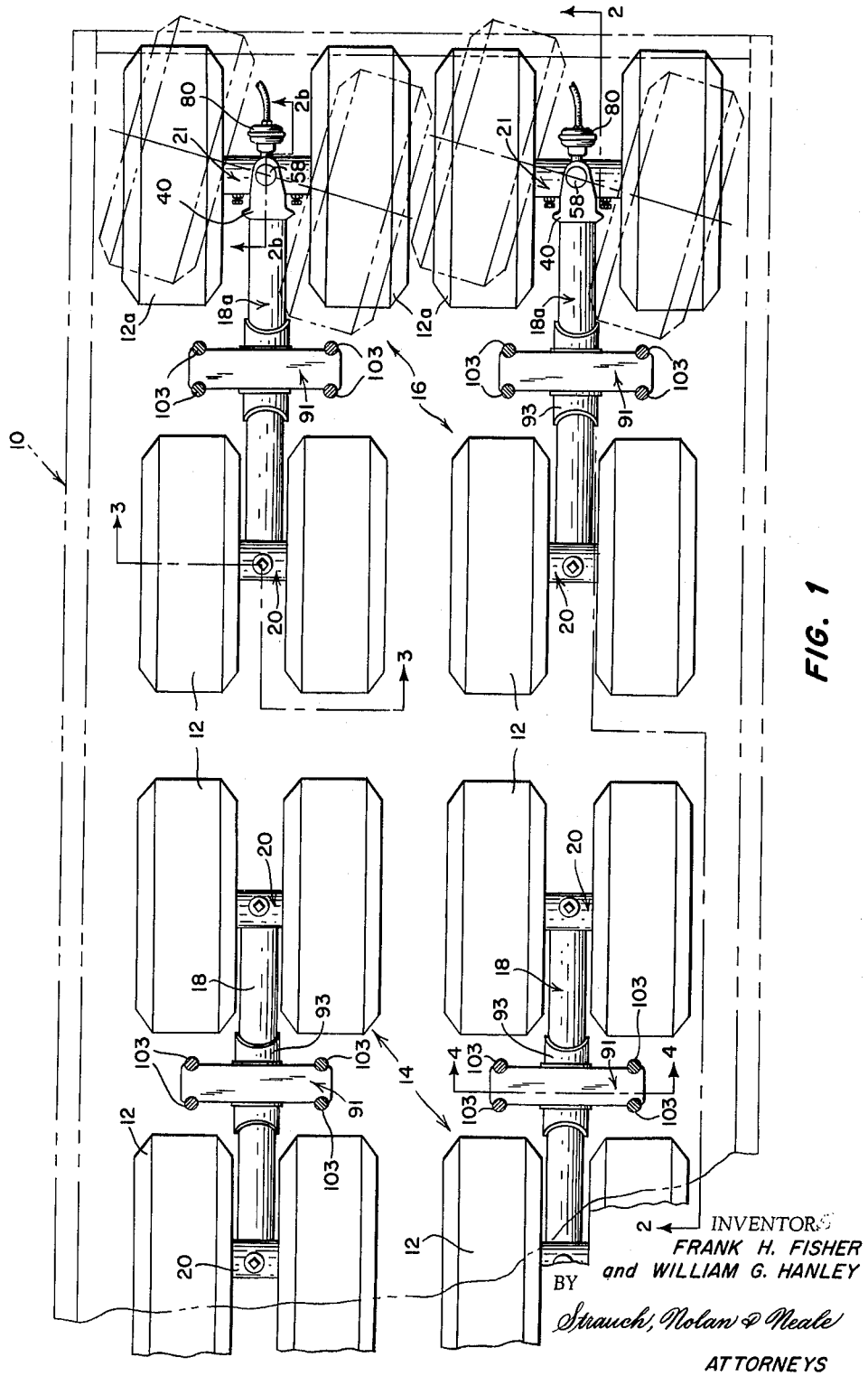

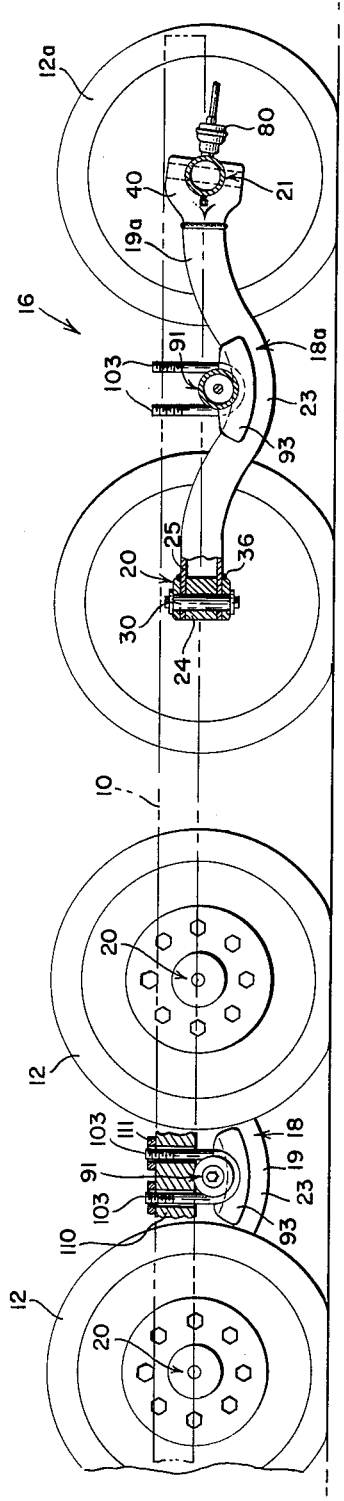
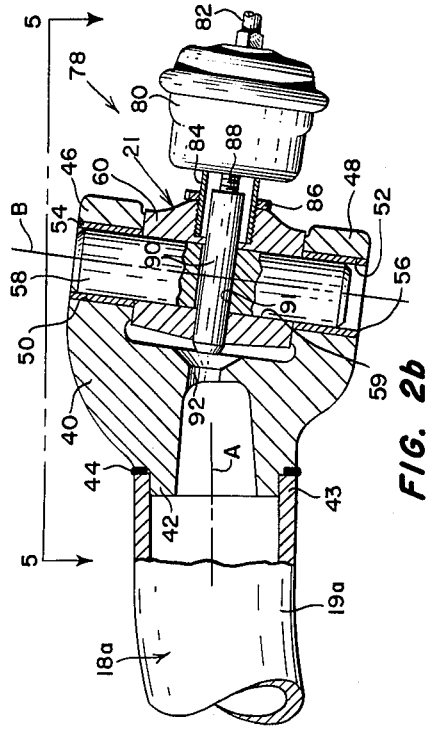
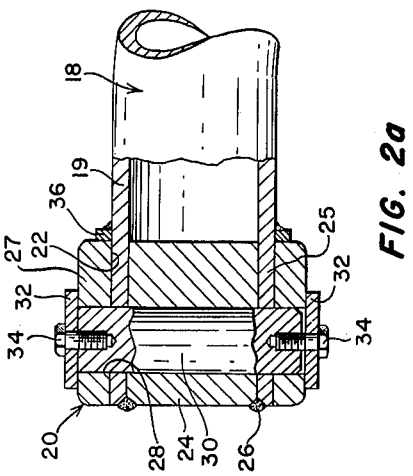
INVENTORS
FRANK H. FISHER
BY and WILLIAM G. HANLEY
Strauch, Nolan & Neale
ATTORNEYS INVENTORS
FRANK H. FISHER
BY and WILLIAM G. HANLEY Strauch, Nolan & Neale
ATTORNEYS June 7, 1966    F. H. FISHER ETAL    3,254,901
BOGIE ASSEMBLY FOR TRAILERS
Filed Feb. 24, 1964    4 Sheets-Sheet 4

Strauch, Nolan & Neale
ATTORNEYS

United States Patent Office 3,254,901
Patented June 7, 1966

3,254,901
BOGIE ASSEMBLY FOR TRAILERS
Frank H. Fisher, Harper Woods, Mich., and William G. Hanley, Kenton, Ohio, assignors, by mesne assignments, to Rockwell-Standard Corporation, a corporation of Delaware
Filed Feb. 24, 1964, Ser. No. 346,859
12 Claims. (Cl. 280—81)

This invention relates to suspensions for heavy duty vehicles and is particularly concerned with heavy duty low bed trailer suspensions.

The invention is concerned mainly with low bed trailers, which are adapted for carrying very heavy loads such as military tank vehicles, wherein a plurality of independent springless bogies are distributed beneath the trailer body. The loads handled by such trailers are so heavy that resilient suspensions are either undesirable or not practical, and the invention provides sturdy flexibly attached bogies of novel construction and arrangement which enable the load to be transported over almost any terrain. By providing a multiplicity of ground engaging wheels the unit loads at each wheel are maintained within safe limits.

It is the major object of the invention to provide a novel trailer vehicle which is supported by a plurality of multiwheel bogies each flexibly attached to the vehicle body.

A further object of the invention is to provide a novel trailer vehicle assembly wherein forward and rear sets of multiwheel bogies are disposed beneath the vehicle body, each bogie comprising a longitudinal walking beam extending between transverse axles and the rearmost axles of the rear bogies being mounted for caster turning on the bogie during vehicle operation. A lockout to selectively disable such caster action may be provided.

A further object of the invention is to provide a novel bogie assembly for a heavy duty vehicle wherein the bogie comprises a walking beam pivoted intermediate its ends on the vehicle frame and transverse axles connected to the opposite ends of the beam, each axle being supported by at least one pair of wheels. In some bogies the axles are rigid with the associated walking beam, and in others certain axles are flexibly connected to the beam for caster type self steering as by a special steering knuckle pivot construction.

It is a further object of the invention to provide a novel bogie construction wherein an intermediately pivoted longitudinal walking beam has its ends fixed to transverse idle axles. In a preferred embodiment the connection between the walking beam and each axle may be released to enable shifting of the axle on the beam for rendering the wheels more accessible for changing tires and the like.

A further object of the invention is to provide a novel multiwheel bogie structure wherein an intermediately pivoted longitudinal walking beam has one end fixed to one transverse axle and its other end pivotally connected to another transverse axle for enabling caster steering movement of said other axle on the bogie.

A further object of the invention is to provide a novel balanced trunnion mounting construction for a multiwheel bogie walking beam.

It is another object of the invention to provide a novel heavy duty multiwheel bogie structure wherein the brake systems for each wheel are independently supported at the axle ends so as to be clear of suspension action.

Further objects of the invention will appear as the description proceeds in connection with the appended claims and the annexed drawings wherein:

FIGURE 1 is an overall top plan view of a trailer assembly showing in full lines bogie and multiwheel construction according to a preferred embodiment of the invention, the trailer body being shown only in phantom lines and certain parts being sectioned for clarity of disclosure;

FIGURE 2 is a side elevation of the trailer assembly of FIGURE 1, partially sectioned and showing further bogie and multiwheel construction;

FIGURE 2a is an enlarged fragmentary elevation, partially broken away and in section, showing the walking beam connection at each end of a non-steerable axle unit;

FIGURE 2b is an enlarged fragmentary elevation, partially broken away and in section on line 2b—2b of FIGURE 1, showing the walking beam connection at each end of a steerable axle unit;

Figure 3:
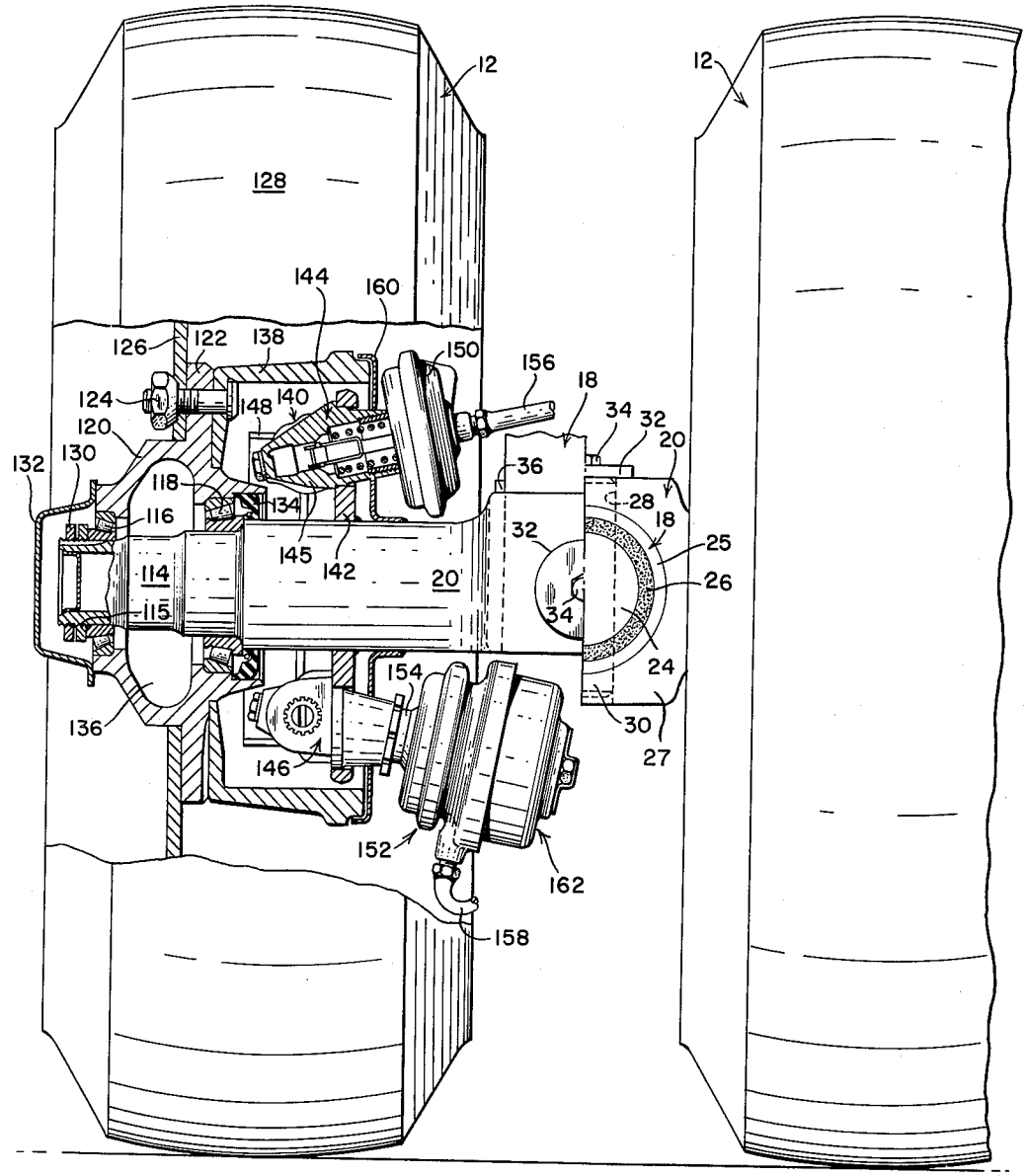
FIGURE 3 is an end elevation substantially along line 3—3 of FIGURE 1, partially broken away and in section, showing details of a rigid non-steerable axle unit wheel and brake mounting, the left side of FIGURE 3 being rotated 90° with respect to the right side to show further detail and the wheel brake structure.

The vehicle into which the present invention is preferably incorporated is a low bed trailer having a rigid platform frame 10 shown in phantom lines in FIGURE 1. This trailer is of the very heavy load carrying type and, as shown in FIGURE 2, the ground engaging wheels 12 and 12a all project above the platform frame level.

Low bed trailer 10 is supported on an undercarriage which does not embody the usual spring suspensions of heavy duty vehicles, mainly because it is undesirable to have the heavy load on frame 10, for example a military tank vehicle, resiliently supported on the undercarriage. This is structurally advantageous in that it eliminates the space requirements of spring suspensions and enables a sturdy simple reliable assembly.

A plurality of independent four wheel bogies comprise the undercarriage in this embodiment, there being two identical side by side forward bogies 14 and two identical side by side rear bogies 16. Each forward bogie 14 consists essentially of a walking beam 18 pivoted intermediate its ends on the frame 10 and connected at front and rear ends to rigid stub axles 20. Each rear bogie 16 consists of a walking beam 18a pivoted intermediate its ends on frame 10, with the forward ends of beams 18a connected to rigid stub axles 20 as in the forward bogies, and the rear ends of walking beams 18a connected to steerable axles 21 as will appear.

Walking beams 18 are of equal length, parallel and pivoted on coaxial axes on the frame 10. All of these walking beam pivot axes are parallel, and the forward walking beams 18 are preferably each longitudinally aligned with a rear walking beam 18a.

Figure 5:
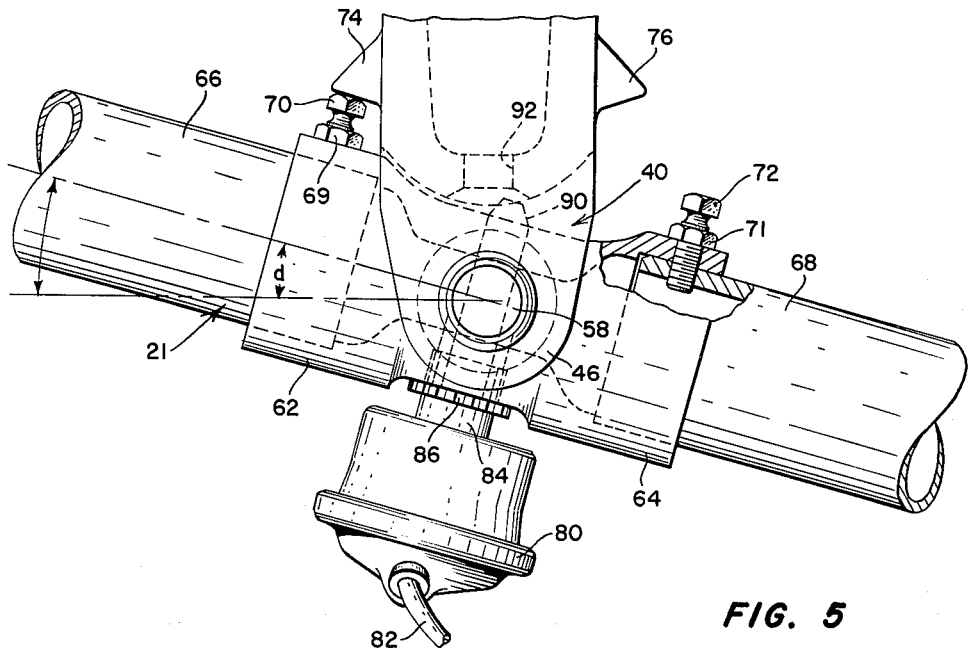
FIGURE 5 is a fragmentary top plan view, partially broken away and in section, substantially on line 5—5 of FIGURE 2b, showing the connection between a walking beam and stub axle in a steerable axle unit.
Figure 4:
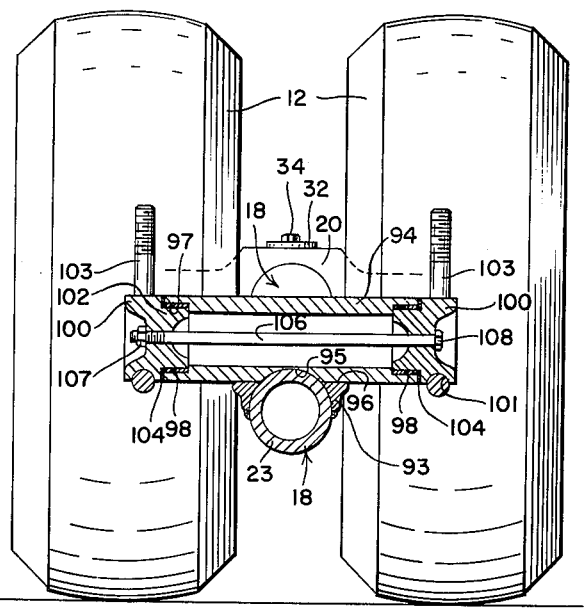
FIGURE 4 is an elevation, in section substantially along line 4—4 of FIGURE 1, showing details of the walking beam trunnion pivot and frame connections.

FIGURE 3 illustrates best the structure of each rigid non-steerable stub axle 20. FIGURE 5 best illustrates each steerable axle unit 21. FIGURE 4 best illustrates the pivotal connection of each walking beam to frame 10, these pivotal connections being of course the only connections between the bogies and frame 10.

Each of the walking beams 18 and 18a is preferably a rigid longitudinal seamless steel tube 19 or 19a bowed downwardly intermediate its ends to form a pivot attachment section 23 (FIGURE 2).

Referring to FIGURES 2, 2a and the right side of FIGURE 3, the coaxial opposite ends 25 of each walking beam 18 extend with a snug but rotatable fit into a through bore 22 formed in the central enlarged section 27 of each axle 20. Preferably the outer ends of beam 18 are ground smooth and even with the axle surfaces. After beam ends 25 are fitted within bores 22, solid plugs 24 of the same cross section as the inside of tube 19 are inserted into the open beam ends and these plugs are ring welded as at 26 to axle 20 to form a strong reinforced unitary assembly. After welding a vertical bore 28 is formed as by drilling through axle 20, beam end 25 and plug 24 and a removable pin 30 is slidably inserted into bore 28. Pin 30 extends the length of bore 28 and at upper and lower ends it carries plates 32 secured thereon as by studs 34. When studs 34 are drawn tight plates 32 which are of much larger diameter than bore 28 are drawn tight against axle 20. Plates 32 prevent entry of dirt or water into the connection.

As a safety feature to aid weld 26 in retaining axle 20 on beam 18, and particularly to prevent longitudinal shift of the beam 18 within bore 22, a reenforcing ring 36 may be secured as by welding upon beam 18 in slidable abutment with the right side of axle 20 in FIGURE 2a. Ring 36 also aids in keeping dirt and water out of the connection.

The foregoing construction of FIGURE 2a exists at both ends of walking beams 18 in bogies 14, and at the forward ends of walking beams 18a in bogies 16.

When the parts are positioned as in FIGURE 2a, the walking beam ends are rigidly and immovably attached to the associated axles. The walking beam cannot rotate or be displaced longitudinally with respect to the axle, and there is no rocking of the axle about the beam. Should it be desired to change a wheel or tire however, studs 34 are loosened to remove plates 32 and pin 30. This frees axle 20 to rock about the longitudinal axis of the beam to better locate the wheel for working on the wheel or tire. The axle is rocked back into position and the pin 30 reinserted and drawn tight again after the tire has been changed.

Referring now to FIGURES 1, 2b and 5 the steerable rear axle 21 of each bogie 16 comprises (FIGURE 2b) a steering knuckle 40 of generally conventional structure having an end boss 42 fitted snugly within the rear open end 43 of walking beam 18a and secured rigidly thereto to form a unitary assembly as by a ring weld 44.

Steering knuckle 40 comprises upper and lower arms 46 and 48 that are inclined slightly downwardly and formed with aligned bores 50 and 52 lined with bushings 54 and 56 to rotatably mount a cylindrical knuckle pin 58. The longitudinal axis of the walking beam tube end indicated at A is horizontal, and it is intersected at other than a right angle by the axis B of pin 58. In the assembly therefore pin 58 tilts at a small angle rearwarly with respect to the horizontal axis A of the walking beam but in the vertical plane containing that axis. In some installations however, pin 58 may be vertical with axes A and B intersecting at right angles.

Pin 58 is rigid with axle 21, and it projects snugly with a press fit through a bore 59 in an adapter 60. As shown in FIGURE 5 adapter 60 has similar tubular open ends 62 and 64 for receiving coaxial axle tubes 66 and 68 respectively. Tubes 66 and 68 are non-rotatably and axially fixed in the adapter as by studs 69 and 71. The outer ends of studs 69 and 71 are formed with heads 70 and 72 respectively which coact with integral ears 74 and 76 on the steering knuckle to limit steering movement of axle 21 in opposite directions about the axis of pin 58.

At their outer ends axle tubes 66 and 68 are provided with conventional wheel mounting spindles and bearings for wheels 12a. In operation the axles 21 are free to turn like casters within an angular range indicated at d in FIGURE 5.

This caster type self steering for the rearmost bogie axles under the frame 10 aids in manouverability of the entire vehicle during turning in forward movement. For straight ahead movement, reverse movement and movement over uneven terrain, as off the road, it has been found desirable to eliminate this self steering arrangement. To this end each axle 21 is provided with a locking mechanism 78 (FIGURE 2b) that is selectively actuated by the vehicle operator to lock or free axle 21 for caster steering.

This locking mechanism comprises a fluid motor casing 80 having a fluid pressure supply line 82 and a forward extension 84 threaded into an adapter bore so that when nut 86 is tightened the motor is fixed to the adapter 60 and the conventional piston or diaphragm attached push rod 88 (FIGURE 2b) extends for mounting a lock pin 90. Pin 90 extends slidably through a bore 91 drilled through adapter 60 and knuckle pin 58. In its FIGURE 2b position lock pin 90 is inactive, being held retracted by the biasing action of the usual return spring within deenergized motor 80. When motor 80 is energized however, push rod 88 projects to thrust lock pin 90 into a longitudinal aperture 92 in steering knuckle 40, whereby knuckle 40 and axle 21 are locked against relative movement.

Referring now to FIGURES 1 and 4 wherein the walking beam pivots are indicated at 91, each walking beam is provided on the concave upper side of its depressed section 23 with a bracket 93. A short cylindrical cross tube 94 has part of its lower surface recessed at 95 to fit upon the walking beam and its opposite ends rest in upwardly concave surfaces 96 on bracket 93. Bracket 93 and tube 94 are here welded together and to beam section 23, so that tube 94 is unitary with the walking beam and extends transversly at right angles to it.

The open ends of tube 94 are counterbored at 97 where they are lined with bushings 98. A pair of frame mounting members 100 have cylindrical bosses 102 disposed within bushings 98. Thrust washers 104 are disposed between the ends of tube 94 and axial faces on members 100. A tie rod 106 extends through both members 100 and tube 94, and has a head 108 on one end and adjustable nut 107 threaded on its other end.

Each mounting member 100 is formed with a groove 101 extending around its lower end to seat a U-shaped clamping bolt 103. As diagrammatically shown in FIGURE 2, each clamping bolt 103 is rigidly secured to a frame member 110 as by fastening elements 111. Any suitable construction may be used to rigidly mount end members 100 in axial alignment on frame 10, and each walking beam is freely pivotal about the axes of these end members by reason of the bearing engagement of tube 94 with bosses 102. Tightening of nut 107 maintains the assembly, and in addition it controls the axial thrust forces to load the bearing mount.

Because of the foregoing each of the bogies 14 and 16 may swing independently about its pivot on frame 10 as the terrain permits or demands. The support of cross tube 94 on opposed frame pivots that are equally spaced on opposite sides of the walking beam provides a balanced sturdy construction. It will be noted that the trunnion axes all lie in substantially the same horizontal plane and are below the trailer bed and the horizontal plane containing the wheel axes.

Referring now to the left side of FIGURE 3, wherein the rigid axle 20 appears essentially in plan as compared to the elevation shown at the right side, the outer end of the axle is formed as a wheel bearing spindle 114 on which are mounted the axially spaced wheel bearings 116 and 118. A wheel hub 120 is mounted on these bearings and is provided with a radial flange 122 to which a wheel disc 126 is removably secured as by studs 124. As shown a tire 128 is mounted on wheel 126.

The outer end of spindle 114 is threaded at 115 to receive lock nuts 130 that retain and adjust the wheel bearings. A cap 132 secured to the hub encloses the lock nuts and the outer end of the spindle.

A seal unit 134 mounted between the hub and the axle protects against entry of dirt and water to the bearings. The internal annular hub space 136 may be filled with lubricant, retained by cap 132 and seal 134, to maintain wheel bearing lubrication.

A brake drum 138 has its radial flange 139 secured as by the studs 124 to hub 120 on the opposite side of flange 122 from wheel 126. A brake mechanism indicated at 140 is mounted on the axle within the drum. This mechanism comprises a spider 142 rigidly secured as by welding directly on the axle 20, spaced actuator assemblies 144 and 146 mounted on the spider and the usual brake shoes 148 movably mounted on the spider adapted to be shifted by the actuators into braking engagement with the drum.

The brake mechanism at 140 is preferably of the wedge actuated plunger type disclosed in U.S. Letters Patent No. 3,068,964 to which attention is directed for further detail.

The actuator assemblies 144 and 146 include fluid pressure motors 150 and 152 respectively, having air pressure supply conduits 156 and 158. A dust shield 160 is secured over the inner end of drum 138, preferably being attached to the axle and having running clearance with the drum in a conventional manner. Actuators 144 and 146 project through openings in the shield.

If desired each brake actuator assembly may be provided with a spring loaded emergency operator indicated at 162 and adapted to apply the brakes upon failure of the air pressure in the vehicle brake system, which operator is preferably that disclosed in United States Letters Patent No. 3,136,227, dated June 9, 1964.

It will be noted that the entire brake mechanism is housed within the wheel structure for protection against dust, water and injury and to locate the mechanism in such position that it will not interfere with the suspension system.

The above described wheel mounting and brake structure of FIGURE 3 is preferably used at all of the axle ends, it being understood however that the single wheels 12 and 12a could be replaced by dual wheels as desired.

While two side by side sets of two bogies are disclosed in the preferred embodiment it will be understood that the invention is equally applicable to vehicles employing more than two bogies both transverse and longitudinal alignment, the caster steering axles however always being at the rear of the rearmost bogies.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a bogie structure for a heavy duty vehicle having a frame, a longitudinal walking beam, a transverse trunnion member rigidly mounted on said beam intermediate its ends, means for pivoting the walking beam on a transverse axis on said frame comprising pivot members mounted on the frame spaced substantially equidistantly from the opposite sides of said beam for freely rotatably mounting the opposite ends of said trunnion member, a pair of relatively short transverse axles supported at opposite ends by ground engaging wheels disposed at opposite sides of said walking beam, and means non-rotatably connecting the opposite end of said beam to the respective axles.

2. In the bogie structure defined in claim 1, said pivot members being spaced apart at least as far as said wheels.

3. In a bogie structure for a heavy duty vehicle having a frame, a longitudinal tubular walking beam, a transverse tubular trunnion member rigidly secured at its central portion directly to the central portion of said walking beam, pivot members secured to the frame freely rotatably mounting the opposite ends of said trunnion member in equidistant spaced relation from the opposite sides of said walking beam for laterally balanced pivoting of the walking beam on a transverse axis on said frame, a pair of relatively short transverse axles supported at opposite ends by ground engaging wheels disposed at opposite sides of said walking beam, and means supportingly connecting the opposite ends of said beam to the respective axles.

4. In a bogie structure for a heavy duty vehicle having a frame, a longitudinal tubular walking beam, a transverse trunnion tube having its central portion rigidly secured to said beam, means on the frame journalling the opposite ends of said trunnion tube for pivoting the walking beam on a transverse axis on said frame, a pair of relatively short transverse axles supported at opposite ends by ground engaging wheels disposed at opposite sides of said walking beam, and means supportingly connecting the opposite ends of said beam to the respective axles, one of said connections between a beam end and the associated axle comprising an inserted plug closing and reenforcing the tubular beam end, socket means on the axle surrounding and slidably receiving the reenforced beam end, and locking means preventing relative displacement of said beam and axle at said socket means.

5. In a bogie structure for a heavy duty vehicle having a frame, a longitudinal walking beam, trunnion means on said beam intermediate its ends for pivoting the walking beam on a transverse axis on said frame, a pair of relatively short transverse axles supported at opposite ends by ground engaging wheels disposed at opposite sides of said walking beam, means connecting one end of said beam rigidly to one of said axles, means pivotally connecting the other end of said beam to the other of said axles to permit swinging of said other axle about a generally vertical axis for steering, and selectively operable cooperating means on said other end of the beam and said other axle for locking said other axle non-rotatably to said beam.

6. In a bogie structure for a heavy duty vehicle having a frame, a longitudinal walking beam, trunnion means on said beam intermediate its ends for pivoting the walking beam on a transverse axis on said frame, a pair of relatively short transverse axles supported at opposite ends by ground engaging wheels disposed at opposite sides of said walking beam, means connecting one end of said beam rigidly to one of said axles, means pivotally connecting the other end of said beam to the other of said axles to permit swinging of said other axle about a generally vertical axis for steering comprising a knuckle rigidly mounted on the other end of said beam having vertically spaced arms embracing an intermediate portion of said axle and a rigid pin on said intermedate axle porton journalled in said arms, and means for selectively locking said other end of said beam to said other axle comprising a pin slidable on said intermediate axle porton and adapted to be projected into a recess in said knuckle.

7. In a bogie structure for a heavy duty vehicle having a frame, a longitudinal walking beam, means for pivoting the walking beam on a transverse axis on said frame, a pair of relatively short transverse axles supported at opposite ends by ground engaging wheels disposed at opposite sides of said walking beam, means rigidly connecting one end of the beam to one of said axles, a steering knuckle on the other end of said beam, a knuckle pin rigid with the other axle rotatably mounted in said steering knuckle, a locking pin slidably mounted on said axle, and a selectively operable motor on said axle for displacing said locking pin into a coacting recess in said steering knuckle for immovably coupling said other axle to said beam.

8. In a bogie structure for a heavy duty vehicle having a frame, a longitudinal walking beam, means pivoting said beam intermediate its ends on a transverse axis on said frame, a pair of relatively short transverse axles, supported at opposite ends by ground engaging wheels disposed at opposite sides of said walking beam, and means connecting the opposite ends of said beam to the respective axles, at least one of said connections comprising socket means supporting the axle on the end of said beam for rocking about an axis longitudinally of said beam and a removable locking member at said socket means for rigidly securing said axle to said beam during normal roadway operation.

9. In the bogie structure defined in claim 8, both of said axle to beam connections comprising said socket means and locking member construction.

10. In the bogie structure defined in claim 8, means pivotally connecting the other of said axles to said beam for limited self steering movement about a generally vertical axis.

11. In the bogie structure defined in claim 10, means for selectively locking said other axle rigidly to said beam.

12. In a bogie structure for a heavy duty vehicle having a frame, a longitudinal walking beam, means for pivoting the walking beam on a transverse axis of said frame, a pair of relatively short transverse axles supported at opposite ends by ground engaging wheels disposed at opposite sides of said walking beam, means rigidly connecting one end of the beam to one of said axles, a steering knuckle on the other end of said beam, a knuckle pin rigid with the other axle rotatably mounted in said steering knuckle, a locking pin slidably mounted on said axle, and means for selectively displacing said locking pin into a coacting recess in said steering knuckle for immovably coupling said other axle to said beam.

References Cited by the Examiner

UNITED STATES PATENTS

| | | | |
|---|---|---|---|
| 1,747,580 | 2/1930 | Fageol | 280—81 |
| 1,762,915 | 6/1930 | Davis | 280—81 |
| 1,925,536 | 9/1933 | Judd. | |
| 1,936,954 | 11/1933 | Robin | 280—81 |
| 2,042,780 | 6/1936 | Greer. | |
| 2,072,787 | 3/1937 | Anderson | 280—104.5 X |
| 2,246,609 | 6/1941 | Townsend | 280—111 |
| 2,311,252 | 2/1943 | Reid | 280—80 X |
| 2,433,268 | 12/1947 | Fellabaum. | |
| 2,459,372 | 1/1949 | Fraunfelder | 280—81 X |
| 2,493,004 | 1/1950 | Mackie | 280—104.5 |
| 2,675,247 | 4/1954 | Meng | 280—111 |
| 2,758,849 | 8/1956 | Compton | 280—104.5 |
| 2,793,872 | 5/1957 | Preslicka et al. | |
| 2,848,245 | 8/1958 | Georgi | 280—81 |
| 2,888,100 | 5/1959 | Chandler | 280—96.3 X |
| 2,919,928 | 1/1960 | Hoffer | 280—81 |
| 3,043,606 | 7/1962 | Raidel | 280—104.5 |
| 3,044,795 | 7/1962 | Standing et al. | 280—81 |
| 3,112,935 | 12/1963 | Gregg et al. | 280—81 |

KENNETH H. BETTS, *Primary Examiner.*

BENJAMIN HERSH, *Examiner.*